Sept. 15, 1936.  J. B. PIERCE, JR  2,054,520
METHOD OF DEHYDRATING GLAUBER'S SALT
Filed Aug. 29, 1933
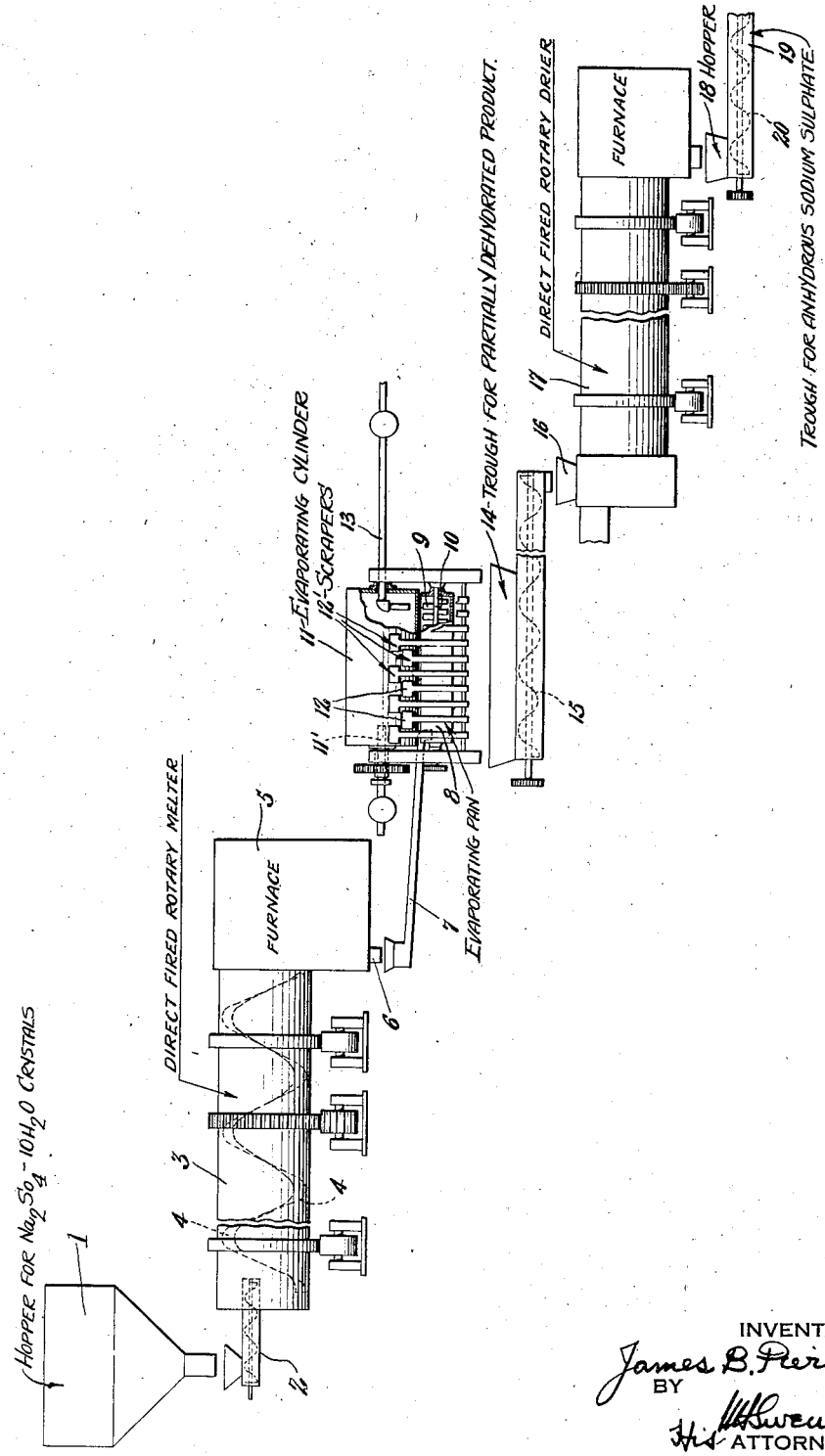

Patented Sept. 15, 1936

2,054,520

UNITED STATES PATENT OFFICE 2,054,520

METHOD OF DEHYDRATING GLAUBER'S SALT

James B. Pierce, Jr., Charleston, W. Va., assignor to Barium Reduction Corporation, Charleston, W. Va., a corporation of Delaware Application August 29, 1933, Serial No. 687,269

6 Claims. (Cl. 23—121)

This invention relates to the dehydration of hydrated sodium sulphate commonly known as Glauber's salt to anhydrous sodium sulphate and has for its particular objects the expeditious and economical production of such dehydrated sodium sulphate by a simple and direct procedure which involves a minimum of expense for equipment.

Crystallized Glauber's salt ($Na_2SO_4.10H_2O$) contains about 56% by weight, of water of crystallization which salt, because of the usually high water content thereof melts or dissolves in its own water of crystallization at a critical temperature of about 32° C. Furthermore, naturally occurring saturated sodium sulphate brine contains approximately 33½% of such Glauber's salt ($Na_2SO_4.10H_2O$) or in the case of supersaturation even a somewhat higher percentage. The above mentioned characteristic tendency for Glauber's salt to dissolve in its own water of crystallization has seriously interfered with the economical removal of such water of crystallization by a simple heating operation, either of the open air or vacuum pan type, since concentrated sodium sulphate liquor "sets up" or plasters hard on the surfaces of the evaporators not only thereby yielding an unsatisfactory product from a physical standpoint, but resulting in the excessive cost of operation because of the necessity for preventing the clogging of the system and also for preventing the entrapped brine from causing a "setting up" of dehydrated crystals in the salt baskets themselves. Furthermore, the equipment heretofore employed in such operation was expensive and difficult to maintain in continuous operation without entailing excessive cost.

Many of the more important processes both mechanical and chemical which have been heretofore proposed for accomplishing the dehydration of Glauber's salt are discussed in a bulletin of the Canadian Department of Mines published at Ottawa, Canada, number 646, pages 47 to 54 thereof, in an article entitled "Sodium sulphate of western Canada" and the various reasons for the unsatisfactory operation of such processes or the excessive cost thereof are summarized therein.

Because of the unsatisfactory nature of the various processes heretofore proposed for the dehydration of Glauber's salt or the evaporation of the highly concentrated naturally occurring saturated sodium sulphate brine, both from the standpoint of economy of operation as well as from economy of equipment, it has been impossible to develop many naturally occurring deposits of Glauber's salt and brine which otherwise would have afforded an excellent source of such material.

My investigations have led to the discovery of an exceedingly simple and practical process for the dehydration of Glauber's salt and which, because of its economy, both as regards operation and equipment costs, is peculiarly adapted for use in the development of deposits of such naturally occurring Glauber's salt crystals and brine, the same being fully set forth in the following detailed description thereof.

In the accompanying drawing, the figure shown schematically illustrates a type of apparatus in which my improved process may be successfully performed.

Referring to the drawing and the construction shown therein, the reference number 1 designates a hopper or bin which is adapted to discharge the Glauber's salt to be dehydrated into the feed trough 2 of a direct fired rotary melter of the well known type of construction, comprising a rotary drum 3 equipped with spirally arranged scrapers or so-called flights 4 and furnace 5. From the discharge 6 of said rotary melter the melted salt is delivered through a chute or pipe 7 into an open evaporating pan 8. Paddles or agitator blades 9 carried by a shaft 10 serve to splash the hydrated sodium sulphate liquor from the pan 8 on to the periphery of a steam heated evaporating cylinder 11 from which the same is continually removed after but a partial revolution of the cylinder by two series of longitudinally staggered overlapping doctor blades are scrapers 12, 12' which are so arranged as to effectively strip the material from the cylinder along its entire length. Steam is supplied to the cylinder 11 through a steam inlet 12 and the water of condensation is drawn off through a drain pipe 13. The heat radiated from said cylinder materially assists to maintain the hydrated sodium sulphate in the pan 8 in a melted condition. Immediately beneath the cylinder 11 is a trough 14 in which a screw conveyer 15 is mounted, which trough serves to carry the partially dried material that is stripped from the cylinder to a hopper 16 that discharges into the front end of a rotary drum drier 17. From the rear end of the drum drier, the dehydrated material is discharged into the hopper 18 of another trough 19, the conveyer 20 of which conducts the dried material to the storage bins (not shown) or if desired, directly into railroad cars.

The preferred method of dehydrating Glauber's salt in the above described apparatus is as follows:—

The hydrous sodium sulphate or Glauber's salt is first melted in the rotary melter 3 and then introduced into the evaporating pan 8 wherein the heat radiated from the cylinder 11 suffices to raise the temperature of the Glauber's salt to about 32° C., the critical melting point of Glauber's salt in its own water of crystallization. While the Glauber's salt is in a thoroughly melted condition, the steam-heated cylinder 11 is caused to revolve and the paddles 9 in the pan 8 are simultaneously rotated, thereby splashing or spattering the melted Glauber's salt against the rotating cylinder, which latter is rotated at such a speed that the water will be evaporated from the Glauber's salt to just the extent necessary to reduce it to a soft semi-plastic condition as it reaches the knives 12, 12' preferably being reduced to a moisture content of between 25% and 35%, whereby the partially dehydrated sodium sulphate can be readily scraped off the cylinder in such a manner as to leave the surface thereof clean thereby preventing any tendency for successive layers to accumulate on the cylinder. If in this preliminary dehydration stage the moisture content of the partially dehydrated sodium sulphate is carried much below 6%, for example below 2% and especially if taken to complete dryness, it plasters hard to the cylinder and cannot be effectively removed.

The partially dehydrated sodium sulphate will now be in a condition resembling bread dough which renders it eminently suitable to be easily handled in the conveyer 14 which serves to receive the material scraped from the cylinder and delivers it to the direct fired rotary drier 17, which latter is maintained at a temperature well above the boiling point of water, but below the fusing point of anhydrous sodium sulphate. I have found that a temperature of about 300° C. to 400° C. is sufficient to cause the completely dehydrated Glauber's salt, or anhydrous sodium sulphate, to be continuously delivered at a temperature of 150° C. to 200° C. into the conveyer 19, at which temperature the complete removal of all water is assured and the product is reduced to a dry condition which adapts the same for convenient loading directly into bins or even directly into railroad cars, if desired.

Among the advantages of the foregoing process are its economy, both as regards original capital cost of the plant, as well as regards fuel and operating costs, and the highly desirable character of the finished product, the same being in a porous, friable condition and of a texture which renders is especially desirable for many commercial uses. Furthermore if the rotary drier is directly fired with an ashless fuel, it is possible without further purification, to obtain a product of sufficient purity for glass making and many other purposes.

In the event the process is operated with the steam cylinder enclosed in a vacuum chamber, as for example by employing a vacuum drum drier, the temperature of the drum surface may be maintained at a correspondingly lower temperature, depending upon the degree of vacuum and consequently the lower boiling point of the water therein under such sub-atmospheric pressures.

While my process is especially applicable to the dehydration of ordinary Glauber's salt, it also lends itself to the dehydration of highly concentrated naturally occurring sodium sulphate brine, approximately corresponding in composition to 33½% of Glauber's salt ($Na_2SO_4.10H_2O$) or even brine solutions of greater concentration due to supersaturation, but obviously when operating on such brine solutions the temperature of the steam heated cylinder 2 must be sufficiently high to insure the reduction of the mass to a semi-plastic condition as it reaches the knives 12, 12'.

While I preferably prevent the dehydration of the material as it is delivered from the cylinder 11 below 20% water content, the same must not be carried below in any event 6% water content, at which point it will plaster so hard to the cylinder that, as above stated, it cannot be effectively removed, and furthermore, the same must not contain sufficient moisture, not more than about 35% by weight, to render the product recovered from the cylinder too fluid for the subsequent treatment in the rotary drier. Accordingly, I make no claim to a process wherein the preliminary steps prior to the firing of the resultant mass in the rotary drier produces a product which has less than 6% nor more than 35% of moisture.

The temperature employed in the rotary drier while preferably, as above stated, is between 300° C. and 400° C. may be lower or even higher than this limit, but when lower temperatures are employed, the same should be not less than 110° C. and the drying operation should be prolonged sufficiently to reduce the sodium sulphate to an anhydrous granular condition. If temperatures higher than 400° C. are employed, then the same should be substantially below 884° C., the melting point of anhydrous sodium sulphate, as otherwise the material cannot be effectively dried in the rotary drier.

In the production of dehydrated sodium sulphate from Glauber's salt and naturally occurring saturated sodium sulphate brines in accordance with my improved method wherein the hydrated sodium sulphate material processed is subjected to a preliminary melting operation, I have been able to obtain from eight to ten pounds of dehydrated sodium sulphate per square foot of drum heating surface per hour, whereas if one attempts to dispense with the rotary melter and endeavors to depend wholly upon the heat radiated from the cylinder 11 to melt the raw Glauber's salt crystals and to maintain the same in a melted condition, the amount of crystals which can be melted in such manner is so negligible that the yield of dehydrated sodium sulphate obtainable is reduced to but a small fraction of the above amount, namely, considerably less than one pound per square foot of heating surface per hour. Furthermore, if it be attempted to deliver hydrated sodium sulphate from the cylinder 11 to the rotary drier 17, which contains as high as 25% to 35% of moisture, as is preferable in my process, the amount of heat radiated from the cylinder 11 through the adhering moist sulphate mass to the hydrated sulphate mass in the pan 8, would be wholly insufficient to either melt the hydrated sodium sulphate in such pan or to maintain the same in a melted condition, even if it were possible to melt it in this manner, and this would be the case irrespective of the temperature to which the cylinder 11 was heated.

Various other types of rotary driers may however be employed in lieu of direct fired rotary driers with very satisfactory results, provided the temperature of the heating medium therein is sufficiently high to effect the quick melting of the crystals as continuously introduced thereinto and preferably furnace gases at a temperature of between 300° C. and 400° C. are employed as the heating medium, because of the availability and cheapness thereof. The temperature of the heating medium employed in this melting stage of the process should be considerably in excess of 150° C., as otherwise, owing to the large amount of material passing through the melter, which in commercial production will average some 8 to 10 lbs. per hour for each square foot of evaporating surface on the cylinder employed in the second stage of the process, the absorption of heat by the material being processed and by the equipment itself, will result in lowering the temperature of the material being processed to such an extent that the effective melting of all of the particles thereof during the passage of the same through the melter will not be satisfactorily accomplished without substantial curtailment of the production. Both in the first stage, or melting stage, or in the final stage or drying stage of the process, the drums 3 and 17 are rotated so as to effect a thorough agitation of the material passing therethrough, and in the case of the first stage of the process, the flights 4 serve to continually scrape and remove the melted material from the inner walls of said drum.

Various modifications and changes other than those herein set forth may also be made without departing from the spirit of my invention as embraced within the scope of the appended claims.

Having thus described my invention, what I claim and desire to obtain by United States Letters Patent is:—

1. In the method of dehydrating hydrated sodium sulphate, the steps which comprise first delivering the liquor, obtained by melting Glauber's salt crystals, into an evaporating pan positioned in proximity to a moving heated surface, projecting the melted material in small separated masses onto the adjacent moving surface heated considerably above the boiling point of water to effect rapid evaporation of the water content of such material, maintaining the material so projected onto said surface in intimate contact therewith until the material is reduced to a semi-plastic condition, then removing the material from such surface and subjecting the same to the action of highly heated gases of combustion, having a temperature less than the melting point of anhydrous sodium sulphate, until the material so treated is reduced to an anhydrous dry condition.

2. In the method of dehydrating solid hydrated sodium sulphate, the steps which comprise delivering liquor obtained by melting Glauber's salt crystals into an evaporating pan positioned in proximity to a heated surface, then projecting relatively small masses of the melted material from such pan onto such surface while the latter is maintained at a temperature considerably above the boiling point of water at the pressure at which the operation is conducted, maintaining the material so projected onto said surface in intimate contact with the latter until the material is reduced to a semi-plastic condition and simultaneously subjecting the material in said adjacent evaporating pan to the influence of the heat radiated from said surface in order to assist in maintaining such material in a melted condition, then removing the material from such surface and subjecting the same to the action of highly heated gases of combustion having a temperature less than the melting point of anhydrous sodium sulphate until the material so treated is reduced to an anhydrous dry condition.

3. The method of dehydrating solid Glauber's salt, which comprises delivering a liquor obtained by melting Glauber's salt crystals into an evaporating pan positioned in proximity to a moving heated furnace, and then concentrating the melted salt, while in the form of thin layers, on such moving heated surface while the same is maintained at a temperature between 120° C. and 150° C., continuing such concentration until the mass is in a semi-plastic condition which admits of the same being readily and completely separated from such surface, continually removing the material, as it becomes semi-plastic, from said surface and completing the dehydration of said material by subjecting the same, while being constantly agitated, to the action of highly heated gases, having a temperature less than the melting point of anhydrous sodium sulphate, intimately commingled therewith.

4. The method of dehydrating solid Glauber's salt, which comprises delivering a liquor obtained by melting Glauber's salt crystals into an evaporating pan positioned in proximity to a moving heated surface, and then concentrating the melted material on such moving heated surface while the same is maintained at a temperature between 110° C. and 150° C., continuing such concentration until the mass of material so treated is in a semi-plastic state which admits of the same being readily and completely separated from such surface, continually removing such material from the surface as it becomes semi-plastic and then completing the dehydration of said material by subjecting the same, while being constantly agitated, to the action of gases of combustion at a temperature from 300° C. to 400° C. and then recovering the resultant anhydrous salt in a granular condition.

5. The method of dehydrating solid Glauber's salt, which comprises delivering a liquor obtained by melting Glauber's salt crystals into an evaporating pan positioned in proximity to a moving heated surface, then concentrating the melted material on such moving heated surface while the same is maintained at a temperature in excess of the boiling point of the melted crystals until the mass assumes a semi-plastic condition and the water content thereof has been reduced to not less than 6% nor more than 35%, then removing the semi-plastic mass from the heated surface and completing the dehydration thereof by subjecting the same to a temperature considerably in excess of 150° C., and below a temperature sufficient to effect the melting of the anhydrous sodium sulphate and then recovering the resultant dry salt.

6. The method of dehydrating solid Glauber's salt, which comprises delivering a liquor obtained by melting Glauber's salt crystals into an evaporating pan positioned in proximity to a moving heated surface, then concentrating the melted material on a moving heated surface maintained at a temperature in excess of the boiling point of the melted crystals until the mass assumes a semi-plastic condition and the water content thereof has been reduced to between 20% and 35%, then removing the semi-plastic mass from the heated surface and completing the dehydration thereof by subjecting the same to a temperature considerably in excess of 150° C., and below a temperature sufficient to effect the melting of the anhydrous sodium sulphate and then recovering the resultant dry salt.

JAMES B. PIERCE, Jr.